(12) United States Patent
Schumann

(10) Patent No.: US 10,673,220 B2
(45) Date of Patent: Jun. 2, 2020

(54) ELECTRIC CURRENT CONDUCTING ASSEMBLY

(71) Applicant: Gary Schumann, Carlton, TX (US)

(72) Inventor: Gary Schumann, Carlton, TX (US)

(73) Assignee: Pole Line Innovations LLC, Abilene, TX (US)

( * ) Notice: Subject to any disclaimer, the term of this patent is extended or adjusted under 35 U.S.C. 154(b) by 0 days.

(21) Appl. No.: 15/839,823

(22) Filed: Dec. 12, 2017

(65) Prior Publication Data

US 2019/0181568 A1  Jun. 13, 2019

(51) Int. Cl.
| | |
|---|---|
| *H02G 7/05* | (2006.01) |
| *H02G 7/00* | (2006.01) |
| *H02G 1/00* | (2006.01) |
| *H02G 1/14* | (2006.01) |
| *H02G 1/02* | (2006.01) |
| *H01R 43/00* | (2006.01) |
| *H01R 4/28* | (2006.01) |
| *H01R 4/38* | (2006.01) |
| *H01R 4/44* | (2006.01) |
| *H01R 4/64* | (2006.01) |
| *H01R 11/32* | (2006.01) |

(Continued)

(52) U.S. Cl.
CPC ............... *H02G 7/056* (2013.01); *H01R 4/28* (2013.01); *H01R 4/38* (2013.01); *H01R 4/44* (2013.01); *H01R 4/646* (2013.01); *H01R 11/32* (2013.01); *H01R 43/00* (2013.01); *H02G 1/00* (2013.01); *H02G 1/02* (2013.01); *H02G 1/14* (2013.01); *H02G 7/00* (2013.01); *H02G 7/05* (2013.01); *H02G 7/053* (2013.01); *H01R 4/36* (2013.01); *H01R 11/09* (2013.01)

(58) Field of Classification Search
CPC ............ H02G 7/056; H02G 1/02; H02G 7/14; H02G 1/04; H02G 7/02; H02G 7/20; H01R 4/44; H01R 11/15; H01R 4/40; H01R 4/62; H01R 11/07; H01R 13/53; H01R 13/5812; H01R 43/00; H01R 43/002; H01R 4/22; H01R 4/2408; H01R 4/2491; H01R 4/366; H01R 4/50; H01R 4/52; Y10T 24/3958; Y10T 29/49194; Y10T 24/3439; Y10T 24/3967; Y10T 29/49195; Y10T 29/53; Y10T 29/53213; Y10T 29/53239; Y10T 29/53243; Y10T 24/1955; Y10T 24/203; Y10T 24/396; Y10T 24/3964; Y10T 403/5713; Y10T 403/7141

See application file for complete search history.

(56) References Cited

U.S. PATENT DOCUMENTS

| | | | |
|---|---|---|---|
| 77,789 A | 5/1868 | Williams | |
| 1,764,372 A * | 6/1930 | Wahlberg | ............... H02G 7/056 24/135 A |

(Continued)

OTHER PUBLICATIONS

J.D. Sprecher et al, Wedge-Connector Technology in Power Utility Applications, AMP Journal of Technology, Jun. 1996, 4-13, vol. 5.

*Primary Examiner* — Edwin A. Leon
*Assistant Examiner* — Matthew T Dzierzynski
(74) *Attorney, Agent, or Firm* — Whitaker Chalk Swindle & Schwa; Carder W. Brooks

(57) ABSTRACT

The technology relates to an electric current conducting assembly, more specifically with the incorporation of a dead end shoe.

17 Claims, 9 Drawing Sheets

(51) Int. Cl.
*H01R 4/36* (2006.01)
*H01R 11/09* (2006.01)

(56) References Cited

U.S. PATENT DOCUMENTS

| | | | | |
|---|---|---|---|---|
| 1,994,003 A * | 3/1935 | Moore | .................. | H02G 7/056 24/135 L |
| 2,062,653 A * | 12/1936 | Hocher | .................. | H02G 7/056 24/135 A |
| 2,374,823 A * | 5/1945 | Leib | .................. | H02G 7/14 174/42 |
| 2,429,705 A * | 10/1947 | Wadsworth | ............ | H02G 7/056 256/37 |
| 2,734,263 A * | 2/1956 | Bergan | .................. | H02G 7/056 29/433 |
| 3,287,491 A * | 11/1966 | Hubbard | .................. | H01R 4/40 174/138 R |
| 4,323,722 A | 4/1982 | Winkelman | | |
| 4,719,672 A * | 1/1988 | Apperson | ................ | G02B 6/48 24/135 R |
| 5,556,299 A | 9/1996 | Finke | | |
| 5,581,051 A * | 12/1996 | Hill | ........................ | H01H 31/00 174/138 R |
| 7,535,132 B2 | 5/2009 | Devine et al. | | |
| 7,562,848 B2 * | 7/2009 | Tamm | .................... | H02G 7/056 24/65 |
| 7,794,291 B2 * | 9/2010 | Goch | ...................... | H01R 4/44 29/868 |
| 8,001,686 B2 * | 8/2011 | Swindell | ............... | G02B 6/483 29/868 |
| 8,025,521 B2 * | 9/2011 | Diniz | ................... | H01R 4/2408 439/395 |
| 9,038,966 B2 * | 5/2015 | Bundren | ............... | H02G 7/056 24/135 R |
| 9,263,871 B2 * | 2/2016 | Diop | ...................... | H02G 7/056 |
| 9,496,700 B2 * | 11/2016 | Bundren | ............... | H02G 7/056 |
| 9,577,354 B2 * | 2/2017 | Wolf | ....................... | H01R 4/62 |
| 9,761,960 B2 * | 9/2017 | Tamm | .................... | H01R 43/00 |

* cited by examiner

ELECTRIC CURRENT CONDUCTING ASSEMBLY

CROSS-REFERENCE TO RELATED APPLICATIONS

None.

STATEMENT OF FEDERALLY SPONSORED RESEARCH OR DEVELOPMENT

None.

REFERENCE TO A SEQUENCE LISTING, A TABLE, OR A COMPUTER LISTING COMPACT DISC APPENDIX

None.

BACKGROUND OF THE INVENTION

This invention relates to an electric current conducting assembly, more specifically with the incorporation of a dead end shoe.

Users of electrical power are often located great distances from the sources of electrical energy. Electricity generated by powerplants, hydroelectric dams, and the like is made available to end users through large, high-capacity, high-voltage, overhead powerline assemblies. These powerline assemblies generally consist of conductors suspended by towers or utility poles that allow for the dissemination of electrical current to consumers from a myriad of sources. When maintenance on these assemblies is required, linemen often perform the maintenance while suspended by a harness from the utility pole or tower; other times, a lifted bucket is used.

At certain points throughout the overhead powerline assembly, the main conductor lines are capped or terminated with metal devices known as dead-end shoes or dead-end shoe assemblies. Many different designs of dead-end shoes exist, but the ultimate purpose is the same: to terminate the conducting line. Generally, dead-end shoes cap or terminate the conductors and facilitate their attachment to insulators located on a tower or pole, effectively containing the current within that length of conducting line. This allows for easier maintenance of the overall powerline assembly, breaking the system and current up into multiple smaller and more-manageable pieces. However, oftentimes, the current must still be transmitted from dead-ended main conductors to the next adjacent dead-ended main conductors to supply electricity further down the powerline assembly. This is accomplished through secondary conductors known as tap or jumper lines that connect dead-ended conductor segments to one another, transmitting the current from an "energized" or "hot" conductor to a "de-energized" or "cold" conductor further downstream.

There are multiple types of connectors that facilitate linkage between the main conductor lines and the jumper lines, dubbed tap-connectors. These tap-connectors are oftentimes completely separate devices from the dead-end shoes that cap or terminate the main conductors, and they are placed further back on the main conductor lines behind the dead-end shoe. Made of metal, the tap-connectors allow for the conduction of electrical current from an energized line to a de-energized line. Many of these tap-connectors have a similar problem of being very difficult or even impossible to remove from the main conductor or jumper once put into place. For example, H-tap connectors clamp two different cables together by bending the metal frame around each conducting line. While it is possible to remove the H-tap from each of the lines, it is difficult to do so; it requires unbending the metal frame of the connector. It is much easier and safer for the lineman to just cut the conducting line behind the H-tap and splice in a new piece of line. Similarly, wedge-connectors create more-permanent connections that are difficult to undo. These connectors consist of a C-shaped metal component with grooves to accommodate two conducting cables. A metal wedge is then inserted, often with a powder cartridge, into the component between the two lines, effectively wedging the cables into the C-component grooves. Removing the wedge after it is inserted, while maybe possible, is often time-consuming and arduous for the lineman performing the maintenance. This usually means that when maintenance of the powerline assembly requires the relocation or removal of either the jumper line, the tap-connector, or a part of the main conductor line, the easier and safer route for the lineman performing the maintenance is to simply clip the conducting line behind the tap-connector; a new length of cable would then be spliced into the conducting line to obtain the length needed to reach the closest tower or pole.

The problem that different types of traditional tap-connectors pose to power line maintenance is two-fold: there is increased risk to linemen who perform maintenance on powerline assemblies, and the process demanded by such connectors is wasteful of materials and time. Linemen often work on powerline assemblies while suspended dozens of feet in the air. The less time they are suspended, the safer they ultimately are. Additionally, tap-connectors are separate and independent devices in the powerline assembly, yet another task in-and-of-themselves for linemen to focus on. Because of the precarious position that linemen are in when performing maintenance, it is extremely important that they remain focused on safety procedures. One mistake and they could plummet to their death or touch an energized line by accident and electrocute themselves. That being the case, the less tasks they must juggle while suspended, the safer they are. Currently, tap-connectors are located behind dead-end shoes, requiring the lineman to reach out farther from his place of suspension to perform any type of maintenance that may be required at that point in the assembly, increasing the overall risk of accident. This risk is compounded if the lineman must attempt to remove the tap-connector from the main conductor or jumper line while suspended. As previously stated, the removal of tap-connectors is nigh impossible, and the more force that the lineman must exert while suspended increases his chance of falling or inadvertently touching an energized cable. Even if the tap-connector is clipped out of the main conductor, the lineman still must then splice a new piece of cable into the main conductor to enable it to reach the utility pole or tower, again increasing their suspension time and dividing their focus.

In addition to the safety issues associated with using traditional tap-connectors, the practice is also extremely wasteful of materials and time. The main conductor is usually clipped behind the tap-connector, and that entire clipped piece of cable is usually discarded. The jumper line itself is also usually discarded due to the difficulty of removing the tap-connector from either the main conductor or the tap conductor. As such, the tap-connector itself is also rarely, if ever, reused; it is discarded along with the rest of the removed components. Also, the process requires that a piece of cable be spliced into the main conductor, wasting time and keeping the lineman suspended for longer.

SUMMARY OF THE INVENTION

This invention satisfies the above needs. A novel dead end shoe assembly to facilitate jumping of an electric current conducting line across an anchor or insulator.

A dead end shoe assembly to cap or terminate at least one "energized" or electric current conducting line and transmit electric current to at least one "energized," "de-energized," other electric current conducting line wherein said assembly comprises at least one dead end shoe anchored to an insulating material, at least one connector block anchored to the dead end shoe comprising at least one hole where a conducting line may attach, and at least one set screw with a standard wrench head for securing a conducting line within the hole of the connector block. The connector block and set screw may be made of an electric current conducting material. The holes of the connector block are sized to fit the diameter of any conducting lines that are attached.

The dead end shoe of the dead end shoe assembly may be any industry used dead end shoe such as those containing a gripping unit and clevis, a straight line dead end shoe, a side-opening dead end clamp, or a strain clamp.

The connector block of the dead end shoe assembly may be fastened to an electric current conducting line with at least one set screw so that said conducting line is compressed into the hole of the conductor block as the set screw is tightened into the interior of said hole thereby compressing and fastening the conducting line to the connector block.

The dead end shoe assembly may act as a jumper line, connecting one electric current conducting line to another or one dead end shoe assembly to another. The second dead end shoe assembly may be similarly attached to at least one other electric current conducting line and anchored to an insulating material. Therefore, the electric current transferred is able to bypass an insulating material that may be used as a support anchor to physical anchor at least one electric current conducting line.

The claimed invention is a method of transmitting electric current from at least one electric current conducting line to another electric current conducting line wherein the electric current conducting lines are physically anchored by an insulator, comprising at least one dead end shoe, at least one connector block, and at least one set screw with a standard wrench head. The connector block and set screw may be made of an electric current conducting material wherein the connector block is anchored to the dead end shoe; wherein the connector block is fastened to an electric current conducting line with at least one set screw so that said conducting line is compressed into the hole of the connector block as the set screw is tightened into the interior of said hole thereby compressing and fastening the conducting line to the connector block; wherein the electric current conducting line is a jumper line connected to at least one other connector block anchored to at least one other dead end shoe.

BRIEF DESCRIPTION OF THE DRAWINGS

These and other features, aspects, and advantages of the present invention will become better understood with regard to the following descriptions, appended claims, and accompanying drawings where:

DETAILED DESCRIPTION OF THE INVENTION

In the Summary of the Invention above and in the Detailed Description of the Invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Where reference if made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

Figure 1A:
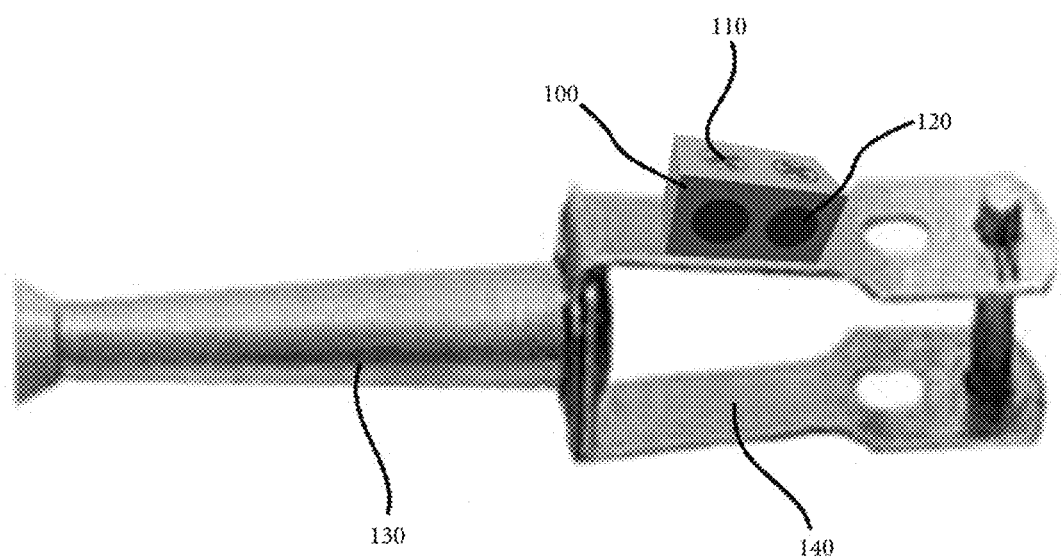
FIG. 1A is a perspective view of one configuration of the dead end show assembly containing a gripping unit and clevis.
Figure 1B:
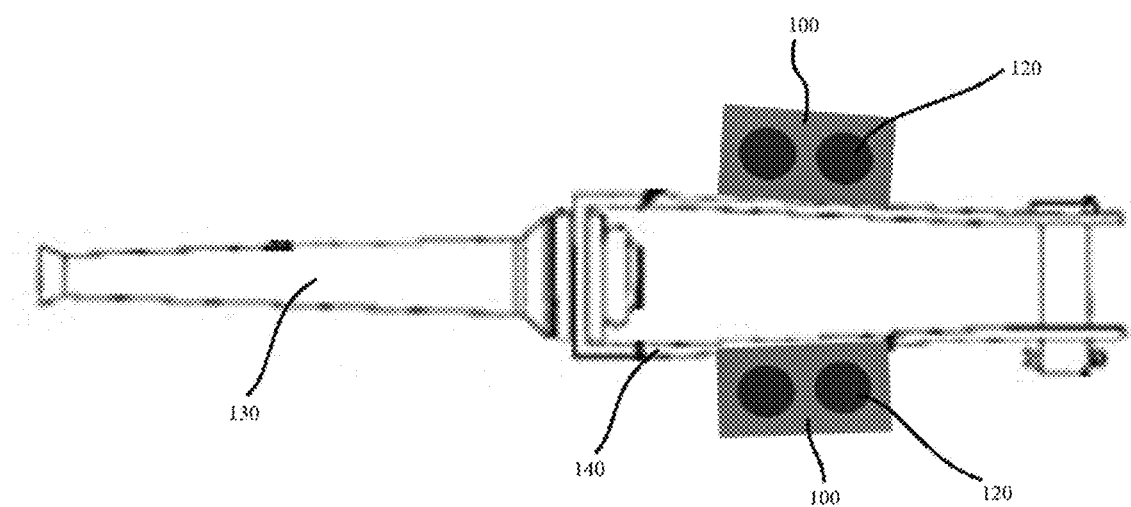
FIG. 1B is a perspective view of one configuration of the dead end shoe assembly containing a gripping unit and clevis.

As shown in FIGS. 1A-1B, one embodiment of the claimed dead end shoe assembly comprises at least a gripping unit 130, a clevis 140, and at least one connector block 100.

As depicted in FIGS. 1A-1B, in a preferred embodiment, the connector block 100 is attached or anchored to the clevis 140 of the dead end shoe assembly. The connector block 100 may be attached or anchored by bolt, clip, clamp, or welding. In another embodiment, the connector block 100 is forged as part of the gripping unit 130 or clevis 140. As specifically depicted in FIG. 1B, there may be a multitude of connector blocks 100 for connecting multiple electric conducting lines or facilitating convenience of the dead end shoe assembly to an electric conducting line.

The connector block 100 comprises at least one hole 120 with at least one set screw 110 for connecting an electric current conducting line. In a preferred embodiment, the electric current conducting line is fed through at least one hole 120 of the connector block 100 and secured in place by tightening at least one set screw 110. In the preferred embodiment, the clevis 140, the connector block 100, and the set screw 110 are comprised of an electric conducting material so as to transfer electric from the dead end shoe assembly to the electric conducting line or from the electric conducting line to the dead end shoe assembly.

Figure 2:
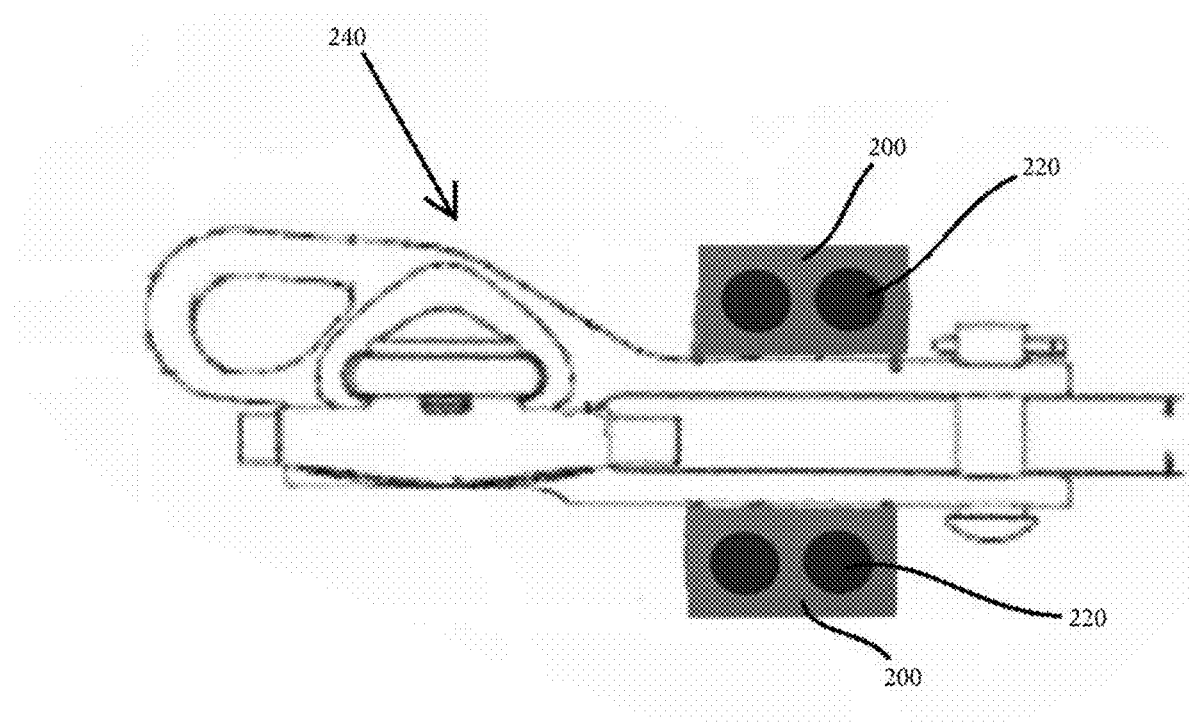
FIG. 2 depicts one embodiment of the dead end shoe assembly containing a straight line dead end shoe.

As shown in FIG. 2, one embodiment of the claimed dead end shoe assembly comprises at least a straight line dead end shoe 240 and at least one connector block 200.

As depicted in FIG. 2, in a preferred embodiment, the connector block 200 is attached or anchored to the straight line dead end shoe 240 of the dead end shoe assembly. The connector block 200 may be attached or anchored by bolt, clip, clamp, or welding. In another embodiment, the connector block 200 is forged as part of the straight line dead end shoe 240. As specifically depicted in FIG. 2, there may be a multitude of connector blocks 200 for connecting multiple electric conducting lines or facilitating convenience of the dead end shoe assembly to an electric conducting line.

The connector block 200 comprises at least one hole 220 with at least one set screw for connecting an electric current conducting line. In a preferred embodiment, the electric current conducting line is fed through at least one hole 220 of the connector block 200 and secured in place by tightening at least one set screw. In the preferred embodiment, the straight line dead end shoe 240 and the connector block 200 are comprised of an electric conducting material so as to transfer electric from the dead end shoe assembly to the electric conducting line or from the electric conducting line to the dead end shoe assembly.

Figure 3:
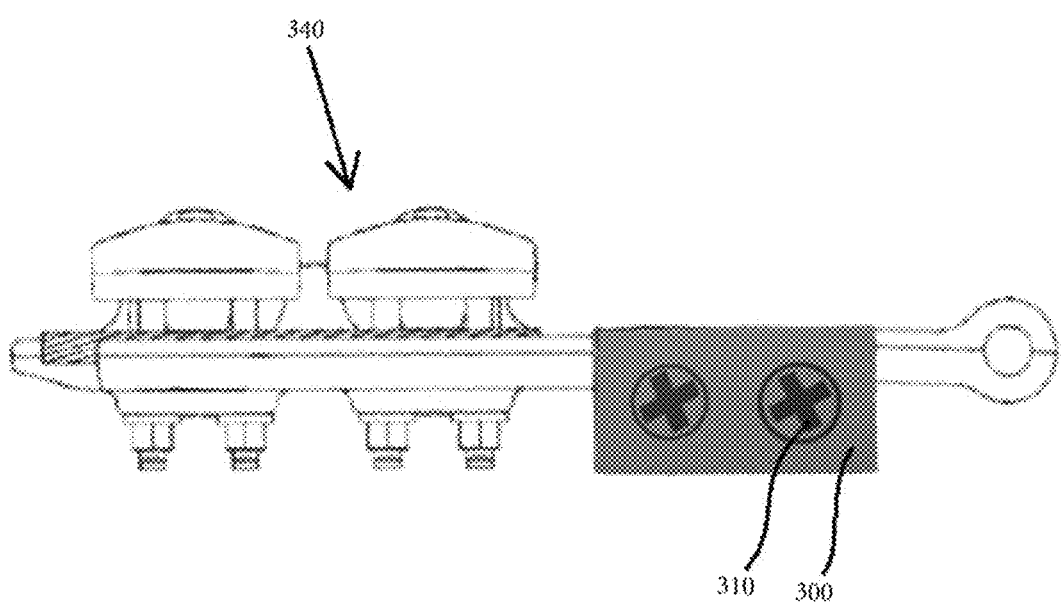
FIG. 3 depicts one embodiment of the dead end shoe assembly containing a side-opening dead end clamp.

As shown in FIG. 3, one embodiment of the claimed dead end shoe assembly comprises at least a side-opening dead end clamp 340 and at least one connector block 300.

As depicted in FIG. 3, in a preferred embodiment, the connector block 300 is attached or anchored to the side-opening dead end clamp 340 of the dead end shoe assembly. The connector block 300 may be attached or anchored by bolt, clip, clamp, or welding. In another embodiment, the connector block 300 is forged as part of the side-opening dead end clamp 340. There may be a multitude of connector blocks 300 for connecting multiple electric conducting lines or facilitating convenience of the dead end shoe assembly to an electric conducting line.

The connector block 300 comprises at least one hole with at least one set screw 310 for connecting an electric current conducting line. In a preferred embodiment, the electric current conducting line is fed through at least one hole of the connector block 300 and secured in place by tightening at least one set screw 310. In the preferred embodiment, the side-opening dead end clamp 340 and the connector block 300 are comprised of an electric conducting material so as to transfer electric from the dead end shoe assembly to the electric conducting line or from the electric conducting line to the dead end shoe assembly.

Figure 4:
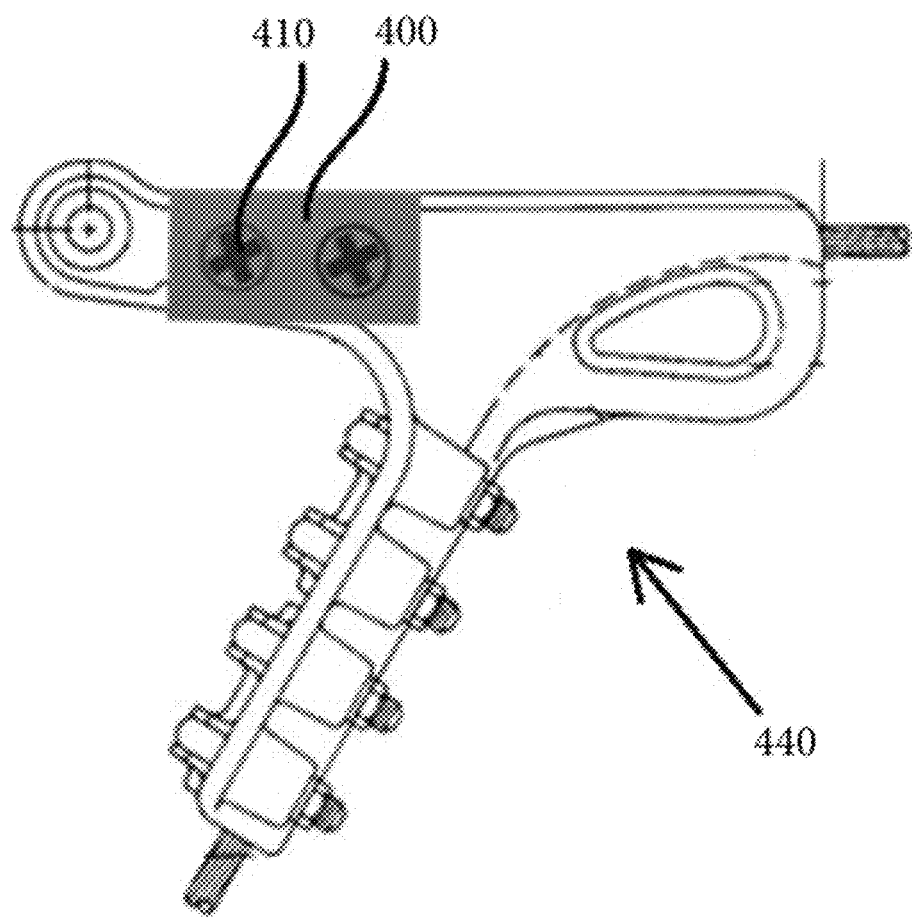
FIG. 4 depicts one embodiment of the dead end shoe assembly containing a strain clamp.

As shown in FIG. 4, one embodiment of the claimed dead end shoe assembly comprises at least a strain clamp 440 and at least one connector block 400.

As depicted in FIG. 4, in a preferred embodiment, the connector block 400 is attached or anchored to the strain clamp 440 of the dead end shoe assembly. The connector block 400 may be attached or anchored by bolt, clip, clamp, or welding. In another embodiment, the connector block 400 is forged as part of the strain clamp 440. There may be a multitude of connector blocks 400 for connecting multiple electric conducting lines or facilitating convenience of the dead end shoe assembly to an electric conducting line.

The connector block 400 comprises at least one hole with at least one set screw 410 for connecting an electric current conducting line. In a preferred embodiment, the electric current conducting line is fed through at least one hole of the connector block 400 and secured in place by tightening at least one set screw 410. In the preferred embodiment, the strain clamp 440 and the connector block 400 are comprised of an electric conducting material so as to transfer electric from the dead end shoe assembly to the electric conducting line or from the electric conducting line to the dead end shoe assembly.

Figure 5:
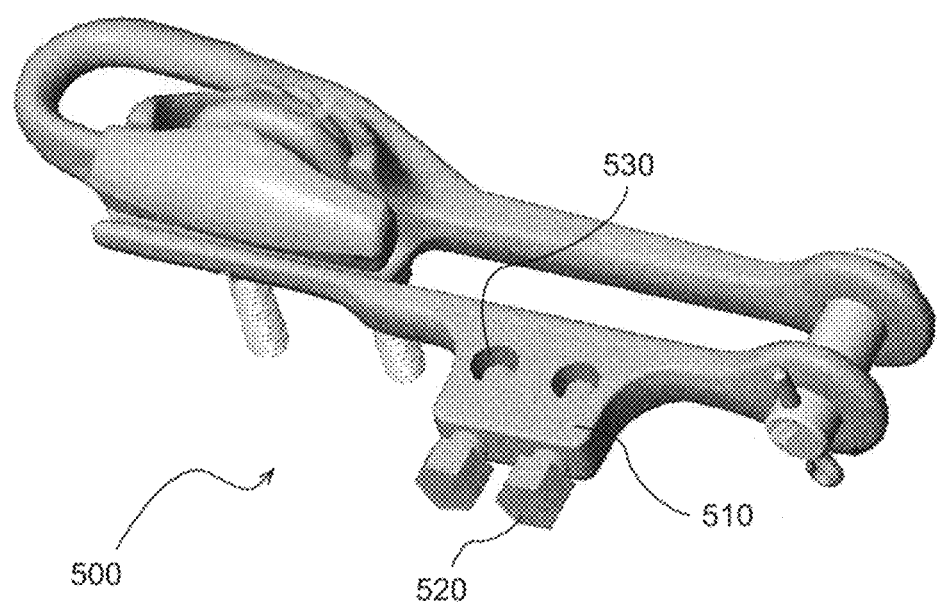
FIG. 5 depicts, like FIG. 2, one embodiment of the dead end shoe assembly containing a straight line dead end shoe.

FIG. 5 depicts a similar embodiment as seen in FIG. 2, wherein an embodiment of the disclosed dead end shoe assembly comprises at a least a straight line dead end shoe 500 and at least one connector block 510. In a preferred embodiment, the connector block 510 is attached or anchored to the straight line dead end shoe 500 of the dead end shoe assembly, by bolt, clip, clamp, or welding. In another embodiment, the connector block 510 is forged as part of the straight line dead end shoe 500. As can be seen in FIG. 5, and in a preferred embodiment, the connector block 510 comprises at least one hole 530 where a current conducting line can thread into. Said current conducting line may be fastened inside the hole 530 by a set screw 520. There may be a multitude of connector blocks 510 for connecting multiple electric current conducting lines.

Figure 6:
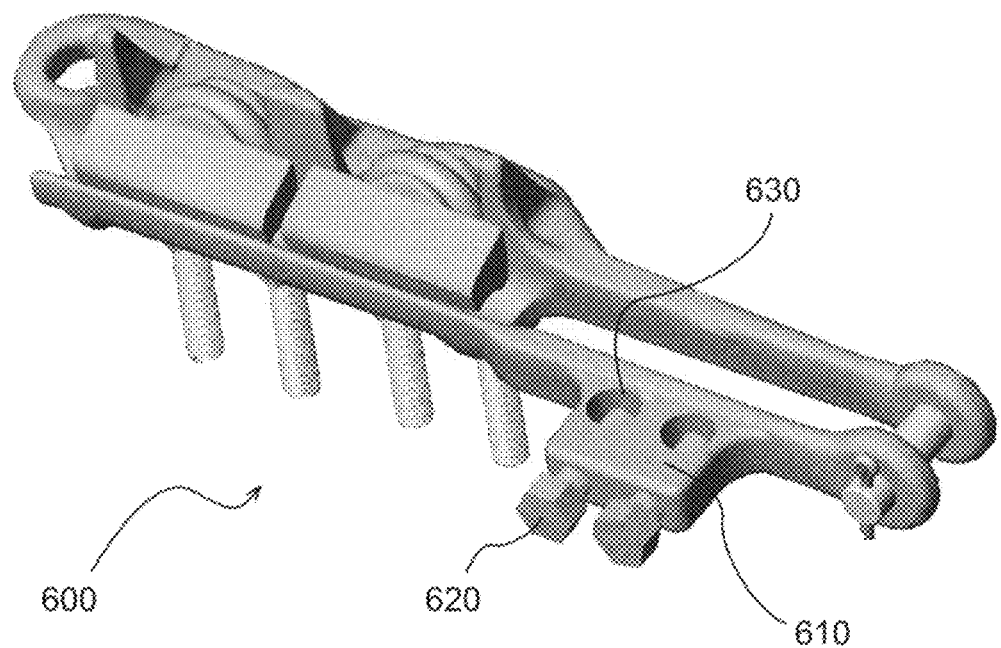
FIG. 6 depicts, like FIG. 3, one embodiment of the dead end shoe assembly containing a side-opening dead end clamp.

FIG. 6 depicts a similar embodiment as seen in FIG. 3, wherein the embodiment of the disclosed dead end shoe assembly comprises at least a side-opening dead end clamp 600 and at least one connector block 610 that can be attached or anchored to the dead end shoe assembly by bolt, clip, clamp or welding. In another embodiment, the connector lock 610 is forged as part of the side-opening dead end clamp 600. There may be a multitude of connector blocks 610 for connecting multiple electric current conducting lines. As can be seen in FIG. 6, and in a preferred embodiment, the connector block 610 comprises at least one hole 630 where a current conducting line can thread into. Said current conducting line may be fastened inside the hole 630 by a set screw 620.

Figure 7:
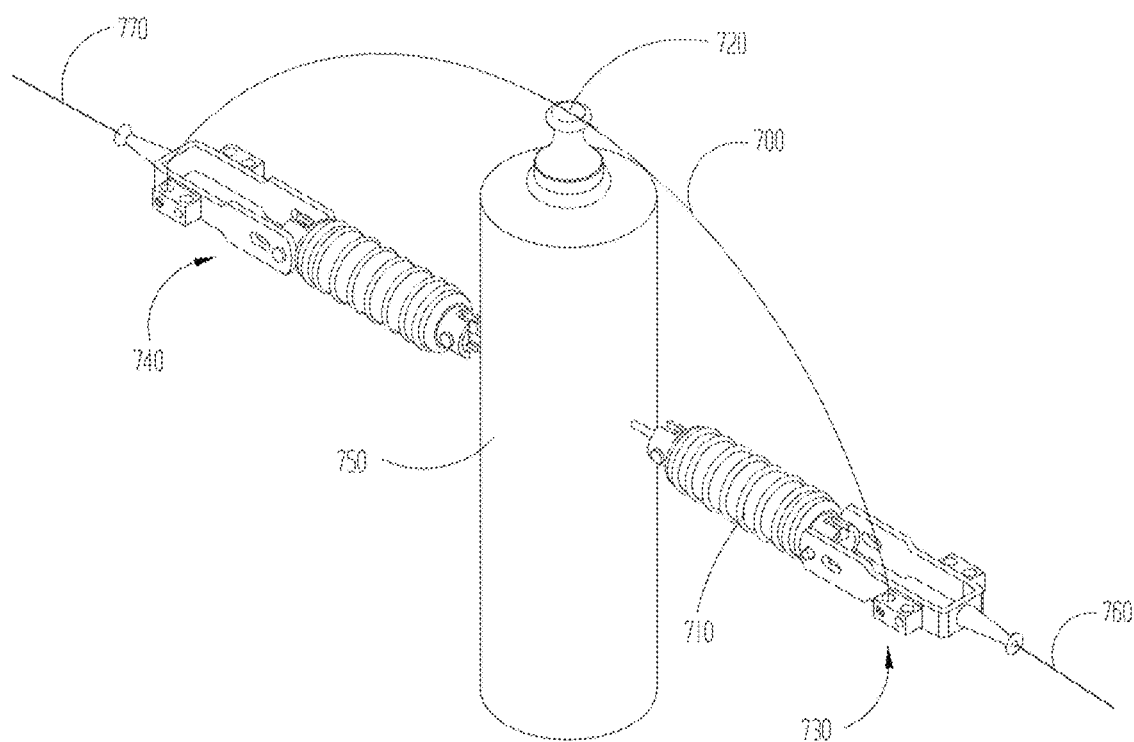
FIG. 7 depicts one embodiment of the disclosed invention, wherein an electric current can be jumped over a utility pole via use of disclosed dead end shoe assemblies.

FIG. 7 depicts a preferred embodiment of the present invention, wherein an electric current can be jumped from an electric current conducting line, over a utility pole, to another electric current conducting line. In this embodiment, a first disclosed dead end shoe assembly 730 is anchored to a utility pole 750 via an insulating material 710 and caps a current conducting line 760. A jumper line 700 can thread into a connector block of said first dead end shoe assembly 730, transiently but firmly secured to the assembly 730 by a set screw of said connector block. Said jumper line can be run over the top of the utility pole 750, stabilized by another insulating material 720, and secured to a connector block on a second dead end shoe assembly 740 that caps another electric current conducting line 770. Because the assemblies 730, 740 are made of electric current conducting material, an electric current may be transmitted from one current conducting line 760 to another current conducting line 770 via a jumper line 700 connected to each dead end shoe assemblies 730, 740. To terminate this transmission, a set screw of a connector block of either of the dead end shoe assemblies 730, 740 that secures the jumper line 720 may be loosened by a standard wrench, and the jumper line 720 may be removed from a connector block of either assembly 730, 740.

Figure 8:
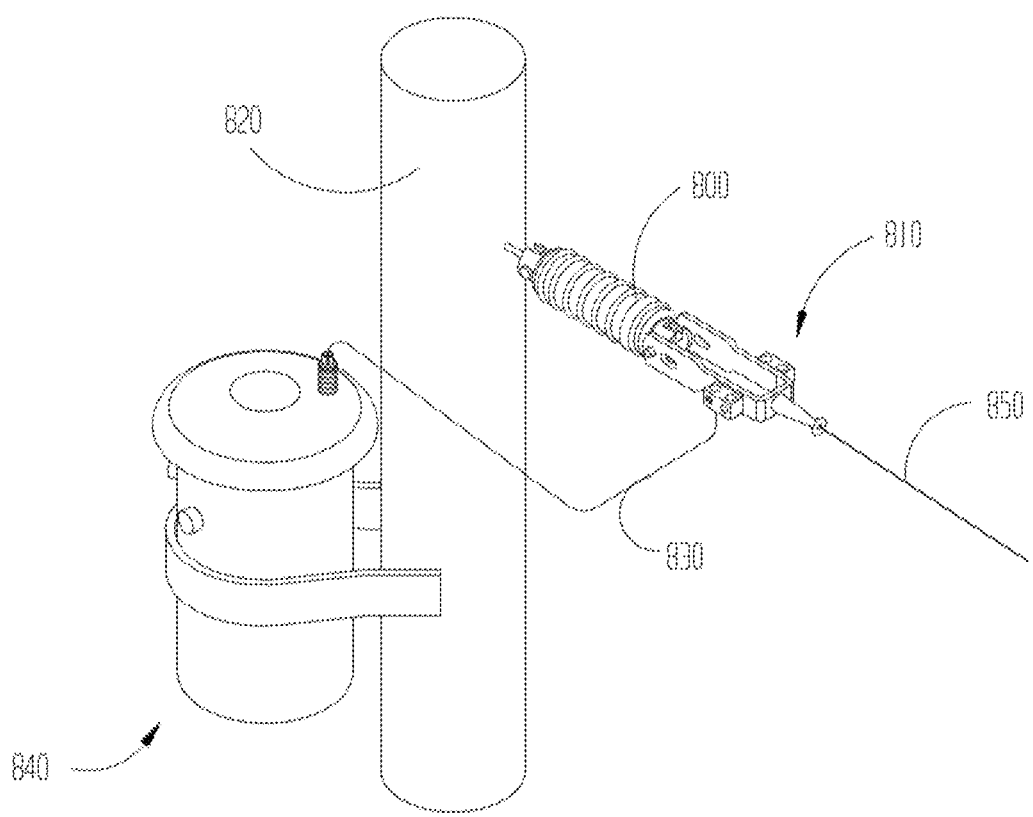
FIG. 8 depicts one embodiment of the disclosed invention, wherein an electric current can be transmitted from a capped current conducting line to a current conducting line housed in a piece of equipment.

Another preferred embodiment is depicted in FIG. 8, wherein an electric current may be transmitted from an electric current conducting line 850 to another current conducting line housed in a piece of equipment 840. In this embodiment, a disclosed dead end shoe device 810 caps a first electric current conducting line 850 and anchors it to a utility pole 820 via an insulating material 800. A second electric current conducting line 830 can be thread into a hole of a connector block of said dead end shoe assembly 810 and secured to the assembly by tightening of a set screw on the connector block. The second current conducting line 830 is attached to a current conducting line housed in a piece of equipment 840, and the electric current from the first current conducting line 850 is transmitted to the current conducting line housed in the equipment via attachment of the second line 830 to the disclosed assembly 810. To terminate the power being transmitted to the current conducting line housed in the equipment 840, the set screw on the assembly 810 that secures the second line 830 may be loosened, and the second line 830 may be removed from the connector block of the assembly 810, effectively terminating the transmission of electricity from the first line 850 to the current conducting line housed in the equipment 840.

What is claimed is:

1. A dead end shoe assembly to cap a first main current conducting line, anchor the first main line to insulating material, and facilitate transmission of electric current to a jumper line wherein said assembly comprises:
   a dead end shoe terminating the first main line and anchoring the first main line to insulating material;
   a connector block permanently attached to the dead end shoe comprising a first hole configured to receive the jumper line and a second hole configured to receive the jumper line; and
   a screw with a standard wrench head for removably securing the jumper line within the connector block;
   wherein the jumper line is removably secured within the connector block;
   wherein the screw is loosened to allow removal of the jumper line from within the connector block while the dead end shoe assembly remains terminating the first main line and anchoring the first main line to said insulating material; and
   wherein the first main line is a tension-bearing line and the jumper is a non-tensioned line.

2. The assembly of claim 1 wherein said connector block and screw are made of an electric current conducting material.

3. The assembly of claim 1 wherein the holes of said connector block are configured to accommodate the diameter of the jumper line.

4. The assembly of claim 1 wherein the jumper line may be removably secured within the first or the second hole of the connector block with the screw such that the jumper line is compressed into one of said holes of said connector block as said screw is tightened into the interior of said hole, thereby compressing and removably securing the jumper line to the dead end shoe assembly.

5. The assembly of claim 4 wherein the jumper line is connected to a second main line.

6. The assembly of claim 5 wherein said second main line is capped and anchored to insulating material.

7. The assembly of claim 1 wherein said assembly facilitates, via the jumper line removably secured within said connector block, the bypassing of said insulating material and transmission of electric current to or from said first main line.

8. The assembly of claim 7 wherein said jumper line removably secured within said hole of said connector block is removed from said hole as said screw is loosened from the interior of said hole thereby ceasing to compress and secure said jumper line to said dead end shoe assembly.

9. A method of jumping electric current in a power line assembly, the method comprising the steps of:
   terminating a first electric current conducting line and anchoring said first line to insulating material via a first dead end shoe;
   connecting a jumper line to said first dead end shoe via a connector block, wherein said connector block is permanently affixed to said dead end shoe, and said jumper line is removably coupled to said connector block by a set screw; and
   connecting said jumper line to a second line capped or terminated with a second dead end shoe such that electrical current may pass to or from said first line to or from said second line via said jumper line;
   wherein said jumper line is selectively removable from said connector block while said first dead end shoe assembly remains capping said first line and anchoring said first line to said insulating material.

10. The method of claim 9 wherein said connector block comprises a hole where said jumper line threads into, wherein the set screw comprises a standard wrench head for removably coupling said jumper line within said hole of said connector block.

11. The method of claim 9 wherein said jumper line may be fastened within said hole of said connector block with the set screw such that said hamper line is compressed into said bole of said connector block as said set screw is tightened into the interior of said hole thereby compressing and hastening said jumper line to said dead end shoe assembly.

12. The method of claim 9 wherein said jumper line fastened within said hole of said connector block is removable from said hole as said set screw is loosened from the interior of said hole thereby ceasing to compress and fasten said jumper line to said dead end shoe assembly.

13. The method of claim 9 wherein said jumper line is coupled to or removed from said connector block while said dead end shoe remains terminating said first line.

14. The method of claim 9 wherein said dead end shoe and said connector block are made of an electric current conducting material.

15. The method of claim 9 wherein said second line is terminated and anchored to insulating material.

16. The method of claim 9 wherein electric current is jumped from said first line to said second line via said jumper line when said first line is energized.

17. The method of claim 9 wherein electric current is jumped from said second line to said first line via said jumper line when said second line is energized.

* * * * *